United States Patent [19]
van Zijderveld

[11] Patent Number: 5,996,776
[45] Date of Patent: Dec. 7, 1999

[54] PLASTIC MODULE FOR A CONVEYOR MAT

[75] Inventor: G. J. van Zijderveld, ś-Gravenzande, Netherlands

[73] Assignee: MCC Nederland B.V., Netherlands

[21] Appl. No.: 08/810,946

[22] Filed: Feb. 27, 1997

[30] Foreign Application Priority Data

Mar. 1, 1996 [NL] Netherlands ............................ 1002501

[51] Int. Cl.$^6$ .................................................. B65G 17/06
[52] U.S. Cl. ........................... 198/853; 198/850; 198/851
[58] Field of Search ...................................... 198/850, 851, 198/853

[56] References Cited

U.S. PATENT DOCUMENTS

| | | | |
|---|---|---|---|
| 5,058,732 | 10/1991 | Lapeyre | 198/853 X |
| 5,217,110 | 6/1993 | Spangler et al. | 198/853 X |
| 5,303,818 | 4/1994 | Gruettner et al. | 198/853 X |
| 5,332,084 | 7/1994 | Greve | 198/853 X |
| 5,335,768 | 8/1994 | Schladweiler . | |
| 5,435,435 | 7/1995 | Chiba et al. . | |
| 5,482,156 | 1/1996 | Damkjaer | 198/853 X |
| 5,634,550 | 6/1997 | Ensch et al. | 198/853 X |

FOREIGN PATENT DOCUMENTS 0 652 169 A1   5/1995   European Pat. Off. .

*Primary Examiner*—Christopher P. Ellis
*Assistant Examiner*—Steven B. McAllister
*Attorney, Agent, or Firm*—Varnum, Riddering, Schmidt & Howlett LLP

[57] ABSTRACT

A plastic module for a conveyor mat, each module comprising on both sides over the entire width a number of equidistant hinge eyes and having a closed bearing surface, the hinge eyes being coupled on a side of a module to those of a module adjoining in the longitudinal direction of the mat by means of a hinge pin. According to the invention a lip-shaped flexible member is provided in the outermost hinge eye of the module includes and extends transversely over the opening for the hinge pin into a part of the hinge eye extended to the longitudinal center of the module, where the lip-shaped member is attached to an end wall of the extended portion. The opposite end wall of the hinge eye is provided with a cam-shaped projection for cooperation with the free end of the lip-shaped member so that this member can be fixed in a position blocking the hinge pin.

7 Claims, 2 Drawing Sheets

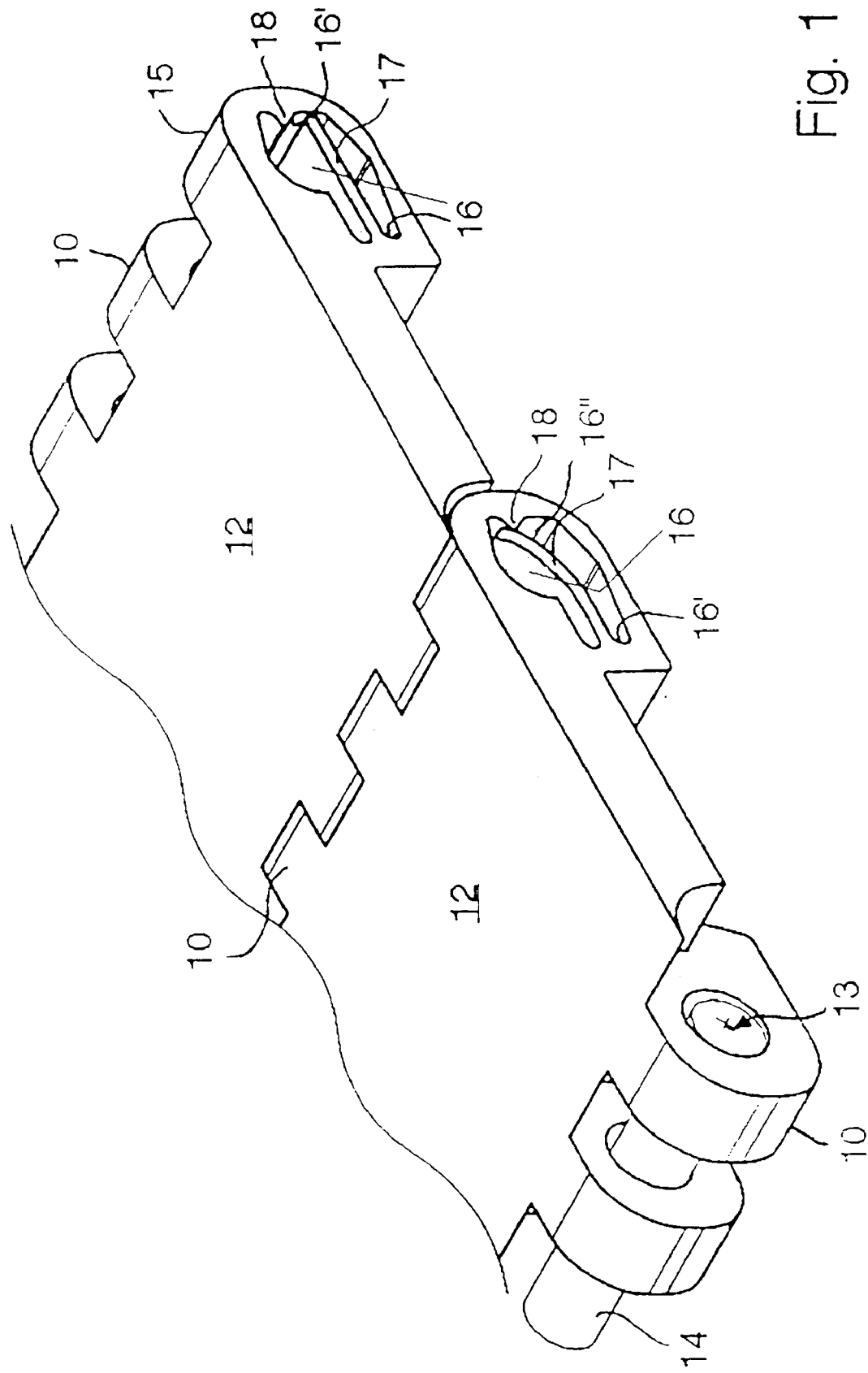

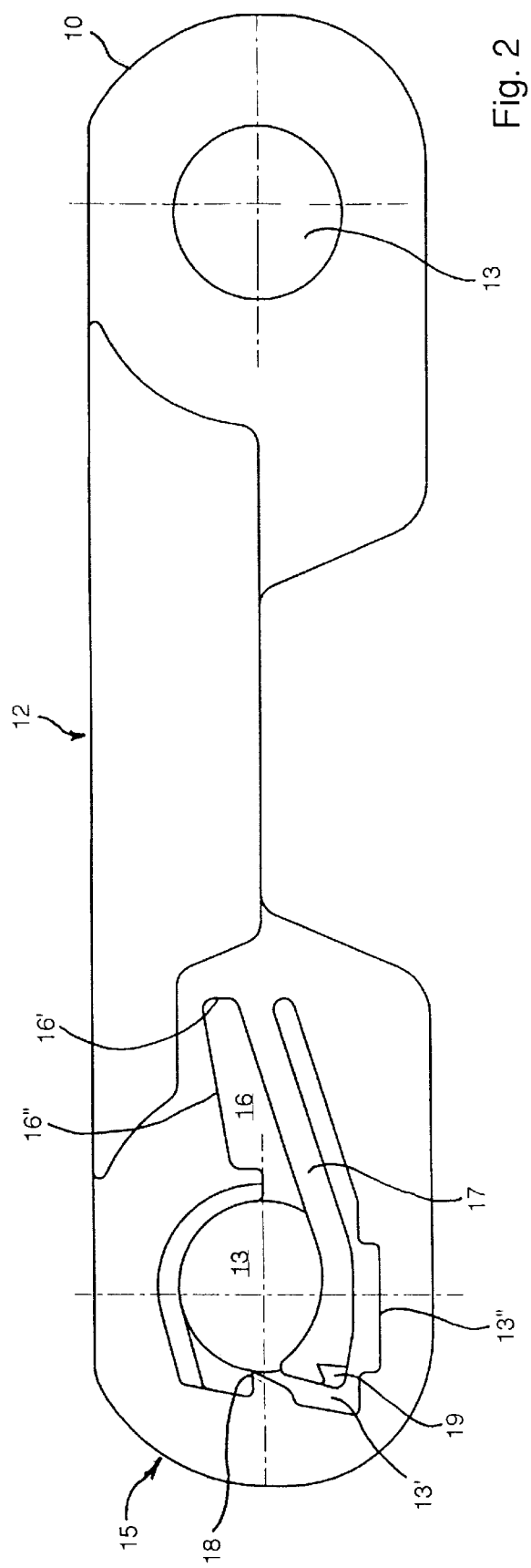

PLASTIC MODULE FOR A CONVEYOR MAT

BACKGROUND OF THE INVENTION

FIELD OF THE INVENTION

The invention relates to a plastic module for a conveyor mat which is built up of such modules, each module comprising on both sides a number of substantially equidistant hinge eyes extending over substantially the entire width of the module, the hinge eyes of a module being coupled together by a bearing surface, the hinge eyes being located on a side of a module between the hinge eyes of a module adjoining in the longitudinal direction of the mat, with the hinge eyes of both modules substantially being in alignment, and coupled together by a hinge pin extending through the hinge eyes, means being provided for locking the hinge pin with respect to the modules.

Such modules are known from EP-A-0598453. A conveyor mat built up of such modules is used in, e.g., the packaging industry, bottling plants and the like, in which the mat may have a relatively large width, up to a few meters, and is designed as an endless conveyor mat which at the beginning and the end of a conveyor path passes over sprockets arranged over the width of the conveyor.

To lock the hinge pin, it is known to use a clip, which is placed in a hinge eye of a module located on the side of the conveyor mat. To this end, this hinge eye, generally the outermost hinge eye on the side, is provided with a slot-shaped opening for receiving the clip. Such a method of locking is described in U.S. Pat. No. 4,832,187.

The use of separate clips has the drawback of complicating the mounting of the mat, in particular when, as is the case with the known clip, the dimensions thereof are small. Also, the clip is awkward to detach, e.g. to replace a hinge pin, and involves the risk that the clip will be mislaid.

EP-A-0652169 discloses a module in which the locking member for the hinge pin of a conveyor mat is integral with the module. To this end, a hinge eye of the module, preferably the outermost hinge eye, is provided with a slot-shaped opening which is formed in the hinge eye from the upper side of the module, which slot-shaped opening, in the condition of rest, includes an elongated lip-shaped element. After combining the modules to form a conveyor mat and after placing the hinge pins, the lip-shaped element can be moved from the condition of rest to a blocking position by pressing it from the upper side of a module via the slot-shaped opening, e.g. with a screw driver, downwards into the hinge eye, a cam-shaped element arranged in the slot-shaped opening being provided for cooperation with the end of the lip-shaped element to hold this element in the blocking position.

Although a number of drawbacks of using separate locking elements are removed with the known construction, the solution described has the drawback that as a result of the construction proposed the hinge eye in which the slot-shaped opening is formed is substantially weakened, which adversely affects the sturdiness of the mat. A further aspect is that conveyor mats are also used when conveying food products for which very high requirements are imposed on the hygienic properties of the mat, i.e. the measures taken to minimize the possibility of dirt deposits and maximize the possibility of removing dirt deposited notwithstanding. To this end, the presence of slot-shaped openings and the like, in particular in the bearing surface of the mat which comes into contact with the food, is highly undesirable.

SUMMARY OF THE INVENTION

The object of the invention is to improve the construction of a locking element known from EP-A-0652169 in a manner such that it can also be used without any inconvenience in a conveyor mat intended for conveying food products, and a further object is to largely prevent a possible weakening of the hinge eyes of a module.

To this end, the invention provides a module of the above type, characterized in that the upper surface of the module, including the upper side of the hinge eyes, is designed as a completely closed surface, that a lip-shaped flexible member is provided in an outermost hinge eye of the module and extends transversely over the opening for the hinge pin into a part of the hinge eye extended to the longitudinal center of the module, where the lip-shaped member is attached to an end wall of the extended portion, that the free end of the lip-shaped member terminates at some distance from the opposite end wall of the hinge pin opening, and that this end wall is provided with a cam-shaped projection for cooperation with the free end of the lip-shaped member so that this member can be fixed in a position blocking the hinge pin.

BRIEF DESCRIPTION OF THE DRAWINGS

The invention will be explained below in more detail by means of a practical example with reference to the accompanying drawings, in which:

FIG. 1 is a diagrammatic perspective view of the end portion of a pair of modules according to the invention;

FIG. 2 is a side view in detail of a single module shown in FIG. 1.

DETAILED DESCRIPTION

FIG. 1 is a diagrammatic perspective view of a pair of modules which forms part of a conveyor mat built up, in a manner known per se, of a large number of such modules.

The modules are each in one piece and are made by means of, e.g., injection molding. Each module comprises a number of substantially identical equidistant hinge eyes 10. The hinge eyes are connected together by means of a bearing surface 12. Each hinge eye 10 is provided with an opening 13 for a hinge pin 14. The hinge eyes and openings are designed in a manner such that all the openings of the modules are in alignment, also when the hinge eyes of a pair of modules adjoining in the longitudinal direction of the mat engage with each other as a result of the fact that the hinge eyes of one module are always located between the hinge eyes of the other module. Thus, the width of a module is determined by the number of hinge eyes of which it is comprised and the length of a module by the distance between the central axes of the hinge eyes.

To block the hinge pins, the outermost hinge eye 15 is always formed at one end of the module in a manner different from the other hinge eyes 10. As clearly appears from FIG. 2 in particular, a hinge eye 15 has a hinge pin opening 13 within a central opening 23 with an extended portion 16 which extends in a direction towards the longitudinal center of the module. At the end wall 16' of the extension 16 a lip-shaped member 17 is formed integral with the module, which member preferably has substantially the same width as the hinge eye 15. Formed at the wall 13' of the hinge pin opening opposite the end wall 16' is a cam-shaped member 18 for cooperation with the free end of the lip-shaped member 17 to lock it in the opening in a manner such that a hinge pin 13 is blocked. In the left-hand module in FIG. 1, the lip-shaped member 17 is shown in the locked position.

To ensure that during use of the mat the hinge pin does not bend or damage the lip-shaped member 17, the free end of this member is preferably provided with a notch 19 of which, seen in the Figure, the upper surface cooperates with the cam-shaped member 18, and of which, seen in FIG. 2, the wall portion located in the plane of the paper forms a stop surface which, in use, comes to lie against the, again seen in the FIG. 2, back face of the cam-shaped member. Thus, the pressure which may be exerted by the hinge pin is absorbed by the back face of the notch 19, which wall portion transfers this pressure to the cam-shaped member.

When placing a hinge pin, the lip-shaped member 17 can be pressed slightly downwards to allow the hinge pin to pass through the hinge pin opening 13. By placing a screw driver between the, seen in the Figure, lower side of the lip-shaped member 17 and the wall portion 13" of the hinge eye, the lip-shaped member can be brought into the locked position behind the cam 18. When, if desired, removing the hinge pin, the free end of the lip-shaped member 17 is pressed out of the locking position behind the cam 18 by means of, e.g., a screw driver, which is placed against the wall portion 16, after which the hinge pin can be removed.

It is observed that when the mat only has the width of one module, this module may have at both ends a hinge eye 15 with a lip-shaped member 17.

It will be clear from the Figures that the invention provides a blocking member for the hinge pins of a conveyor mat, which may be formed integral with a module for the mat, while at least the upper surface of the module remains completely closed, which has the result that the mat is very suitable for hygienically conveying food products and is easy to clean. Another advantage of the invention is that the strength of the hinge eye 15 is not influenced because it is composed in the transverse direction of the module of the same amount of plastic material as the hinge eyes 10.

I claim:

1. A module for use in a longitudinally extending conveyer mat comprising a plurality of such modules, the module having a predefined width and a first end and a second end opposite said first end and a longitudinal center disposed between said opposite ends, the module further comprising:

a plurality of hinge eyes on each of said first and second opposite ends for receiving a hinge pin and spaced apart by spatial areas, said hinge eyes of said first end being aligned with said spatial areas of the second end, each hinge eye having an upper surface extending substantially the width of the hinge eye and a lower surface extending substantially the width of the hinge eye;

each of said hinge eyes having a central opening having an end wall and said hinge eyes on said first end being aligned along a first longitudinal axis and hinge eyes on said second opposite end being aligned along a second longitudinal axis exeending substantially parallel to said first longitudinal axis;

a closed bearing surface extending between said opposite ends and over said hinge eyes;

an extended portion disposed adjacent lower surface of a center section of the module and adjacent at least one of said opposite ends of the module;

a lip-shaped flexible member extending from said extended portion and into said central opening of at least one of said hinge eyes of said at least one of said opposite ends, said lip-shaped member extending transversely to said longitudinal axis and toward said longitudinal center and having a free end terminating in said central opening of said at least one of said hinge eyes; and a cam-shaped projection disposed on said end wall of said at least one of said hinge eyes for cooperation with said free end of said lip-shaped member, whereby the lip-shaped member may be fixed in a position blocking lateral movement of a hinge pin disposed in said hinge eyes.

2. The module in accordance with claim 1 wherein the lip-shaped member comprises a stop surface for cooperation with said cam-shaped projection to prevent a lateral movement of the lip-shaped member.

3. The module in accordance with claim 1 wherein the hinge eye has a predefined width and the lip-shaped member extends over substantially the entire width of the opening in the hinge eye.

4. The module in accordance with claim 2 wherein the hinge eye has a predefined width and the lip-shaped member extends over substantially the entire predefined width of the hinge eye.

5. The module in accordance with claim 1, wherein the module is constructed of a plastic material.

6. A longitudinally extending conveyer mat comprising a plurality of interconnected modules, each of the modules each having a predefined width and a first end and a second end opposite said first end and a longitudinal center disposed between said opposite ends, each of the modules further comprising:

a plurality of hinge eyes on each of said first and second opposite ends for receiving a hinge pin and spaced apart by spatial areas, said hinge eyes of said first end being aligned with said spatial areas of the second, end each hinge eye having an upper surface extending substantially the width of the hinge eye and a lower surface extending substantially the width of the hinge eye;

each of said hinge eyes having a central opening having an end wall and said hinge eyes on said first end being aligned along a first longitudinal axis and said hinge eyes on said second opposite end being aligned along a second longitudinal axis extending substantially parallel to said first longitudinal axis;

a closed bearing surface extending between said opposite ends and over said hinge eyes;

an extended portion disposed adjacent, a lower surface of a center section of the module and adjacent at least one of said opposite ends of the module and a lip-shaped flexible member extending from said extended portion and into said central opening of at least one of said hinge eyes of said at least one of said opposite ends, said lip-shaped member extending transversely to said longitudinal axis and toward said longitudinal center and having a free end terminating in said central opening of said at least one of said hinge eyes; and a cam-shaped projection disposed on said end wall of said at least one of said hinge eyes for cooperation with said free end of said lip-shaped member, whereby the lip-shaped member may be fixed in a position blocking lateral movement of a hinge pin disposed in said hinge eyes.

7. The module in accordance with claim 6 wherein the lip-shaped member comprises a stop surface for cooperation with said cam-shaped projection to prevent a lateral movement of the lip-shaped member.

* * * * *

UNITED STATES PATENT AND TRADEMARK OFFICE
CERTIFICATE OF CORRECTION

PATENT NO. : 5,996,776

DATED : Dec. 7, 1999

INVENTOR(S) : G.J. van Zijderveld

It is certified that error appears in the above-indentified patent and that said Letters Patent is hereby corrected as shown below:

Col. 3, line 51:
        before "hinge" insert --said--
    Col. 3, line 53:
        the word "exeending" is misspelled and should be replaced with
        --extending--

Signed and Sealed this

Fifth Day of September, 2000

Attest:

Q. TODD DICKINSON

Attesting Officer

Director of Patents and Trademarks